Patented May 28, 1929.

1,714,565

UNITED STATES PATENT OFFICE.

FRITZ LANGE, OF ELBERFELD, GERMANY, ASSIGNOR TO I. G. FARBENINDUSTRIE AKTIENGESELLSCHAFT, OF FRANKFORT-ON-THE-MAIN, GERMANY.

MANUFACTURE OF DEPOLYMERIZATION OR DEGRADATION PRODUCTS OF CARBOHYDRATES OF HIGH MOLECULAR WEIGHT.

No Drawing. Application filed March 16, 1927, Serial No. 175,940, and in Germany March 17, 1926.

The present invention relates to the manufacture of depolymerization or degradation products of carbohydrates of high molecular weight.

The invention resides in a process for the manufacture of depolymerization products of carbohydrates of high molecular weight, as for example, the various types of starches and celluloses, according to which the carbohydrates are treated with ethylene glycol or monochlorhydrine or a mixture thereof until the required degree of depolymerization or degradation is reached.

The ethylene glycol and ethylene monochlorhydrine are embraced by the general formula:

in which X stands for chlorine or an hydroxyl group.

In carrying out the process the carbohydrates to be degraded are simply boiled with the depolymerizing or degrading agent under reflux until the required degree of degradation or depolymerization is reached; the depolymerizing or degrading agent is then separated from the reaction mixture.

An important advantage of my process is that on the termination of the reaction the depolymerizing agent can be completely removed by distillation in vacuo at comparatively low temperatures, in consequence of which the further working up and purification of the products of depolymerization is relatively simple and inexpensive.

An important advantage in the use of monochlorhydrine as the depolymerizing agent is that it completely dissolves cellulose which has not been previously treated in any way, in a short time. In this case also, as in the case of starch, products are obtained which are soluble in alcohol and water, which no longer exert a reducing action and which on hydrolysis with acids yield sugars.

The new products are, in contradistinction to the primary materials, easily soluble in water and in alcohol but insoluble in ether. They are light colored oils having a sweet taste but leaving a bitter aftertaste in the mouth. They are mixtures of compounds of varying molecular weight and probably consist of anhydrides of hexoses. The compounds of lower molecular weight can be distilled in vacuo. The new products may be used for pharmaceutical purposes.

The following examples will illustrate the principles underlying my invention which is, of course, not restricted to the details thereof:

*Example 1.*—500 parts by weight of ethylene glycol are heated to boiling and 100 parts by weight of starch are dissolved therein with stirring. After heating to boiling for 2½ hours the reaction mixture ceases to give a color reaction with iodine. The glycol is distilled off in a vacuum of 8 mm. at 88° C. The remaining residue is easily soluble in alcohol, has the appearance of a clear syrup and possesses a sweet taste.

*Example 2.*—500 parts by weight of glycol are heated to boiling with 100 parts by weight of starch. After the addition of 5 parts by weight of monochlorhydrine and continued boiling for about 5 minutes the iodine reaction becomes negative. The total duration of heating in this case is about 30 minutes. The further working up is effected as described in Example 1. The product is an oily liquid showing no reaction with iodine, easily soluble in water and in alcohol and insoluble in ether. It does not reduce Fehling solutions. It is not a sugar but can be converted into a sugar by heating it together with a dilute acid.

*Example 3.*—100 parts by weight of monochlorhydrine are heated to about 180° C. and 10 parts by weight of paper pulp or cotton are introduced. After about 1 to 1½ hours heating 85% of the cellulose used are dissolved. The further working up is effected as described in Example 1.

I claim:

1. In processes for the depolymerization or degradation of carbohydrates of high molecular weight involving heating the carbohydrates with depolymerizing or degrading agents, the use as the depolymerizing or degrading agent of a compound of the general formula:

in which X stands for chlorine or an hydroxyl group.

2. In processes for the depolymerization or degradation of carbohydrates of high molecular weight involving heating the carbohydrates with depolymerizing or degrading agents, the use as the depolymerizing or degrading agent of a mixture of ethylene glycol and ethylene monochlorhydrine.

3. Process for depolymerizing or degrading cellulose which comprises heating to boiling temperature a mixture of cellulose and a depolymerizing or degrading agent comprising ethylene monochlorhydrine.

4. As new products, depolymerization or degradation products of carbohydrates of high molecular weight, being light colored oils soluble in water and in alcohol, insoluble in ether, and having a sweet taste with a bitter aftertaste.

In testimony whereof I have hereunto set my hand.

FRITZ LANGE.